Nov. 13, 1951           E. BOBARD           2,575,256

MULTIPLE MOTORS FOR VEHICLES AND CONTROL THEREOF

Filed April 19, 1945           4 Sheets—Sheet 1

Inventor
Emile Bobard
by his attorneys
Howson and Howson

Inventor
Emile Bobard
by his attorneys
Howson and Howson

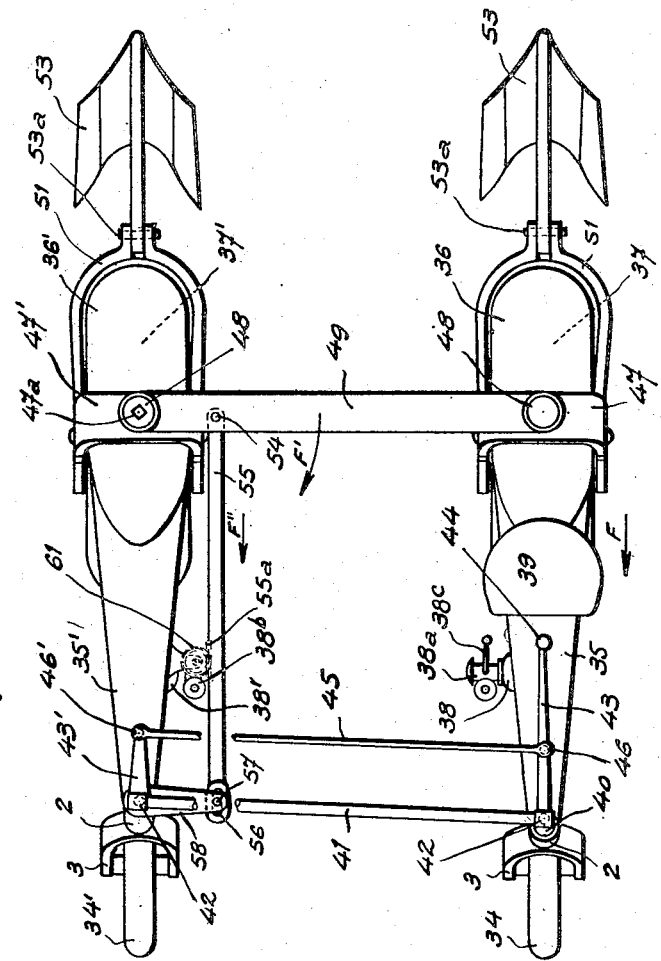
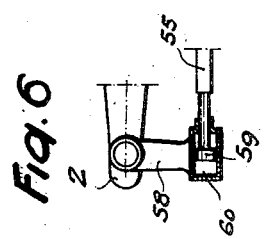

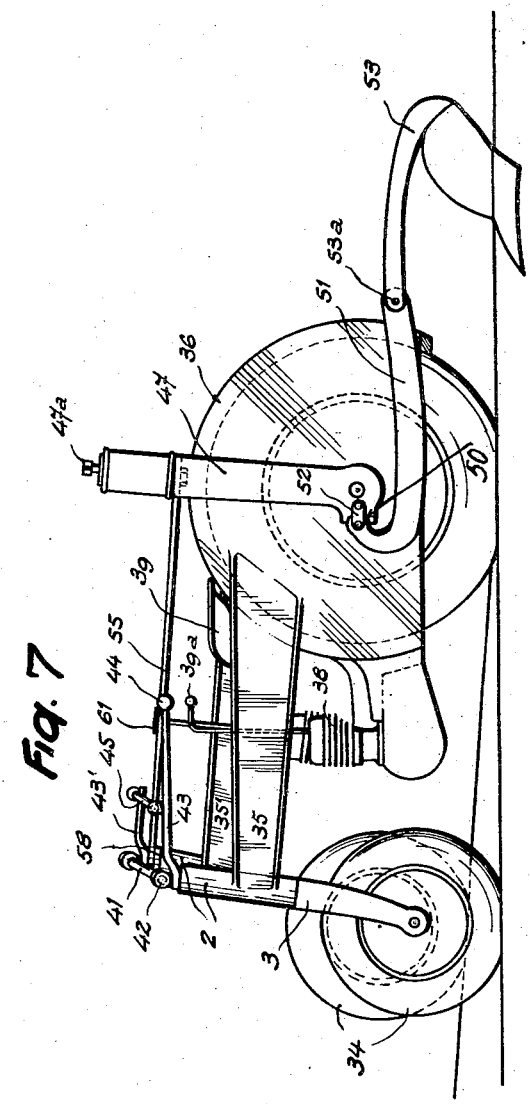

Patented Nov. 13, 1951

2,575,256

UNITED STATES PATENT OFFICE 2,575,256

MULTIPLE MOTORS FOR VEHICLES AND CONTROL THEREOF

Emile Bobard, Beaune, France

Application April 19, 1945, Serial No. 589,115
In France June 3, 1942

Section 1, Public Law 690, August 8, 1946
Patent expires June 3, 1962

11 Claims. (Cl. 180—54)

This invention relates to power driven vehicles comprising at least two motor-shafts driven independently by separate motors, such as motors housed inside the wheels. In such arrangements avoidance of all power transmitting means between the vehicle frame and the wheels, permits the provision of several driving wheels on special vehicles having either an overhanging frame or a super-elevated frame. Vehicles of this sort are useful as agricultural tractor in vineyards. Furthermore said arrangements also simplify the construction of the vehicles adapted to move over any ground wherein the front wheel carriage and the rear wheel carriage should be capable of rocking to a substantial degree one with reference to the other around the longitudinal axis of the frame.

The provision of several independent motors on a single vehicle requires in practice special devices for adjusting the relative power of these different motors, as for equalizing the power of the corresponding right hand and left hand wheels.

Moreover, the relative adjustment of the different motors during the progress of the vehicle is required not only by reason of the fortuitous variations in power due for instance in the case of internal combustion motor to irregularities in operation, but by reason of the variation in the power required at the different wheels of the vehicle due to unevennesses of the ground which may be very important in the case of agricultural tractors.

It is an object of the invention to provide special means to insure such an adjustment of the power delivered to the different wheels and particularly to provide means to automatically adjust the power provided by the different motors so as to constantly balance the power required from them.

Another object of the invention is to provide for relative movement of the points of application of the resistant stresses applied to the different wheels or sets of wheels carrying independent motors, as soon as the power delivered by one of the motors differs from the power demanded from it, the displacement of one point relative to the other being used for modifying the power provided so as to balance it with the power required.

Other objects and advantages of my invention will become apparent on examination of the particular cases described and illustrated hereinafter.

Fig. 5 shows in plan view a four-wheel tractor embodying the invention, the two rear wheels being driving wheels and the two front wheels being steering wheels;

Fig. 6 is a detail plan view of a connection between the steering tube and connecting link.

Fig. 7 is an elevational view of the tractor shown in Fig. 5.

Figure 1:
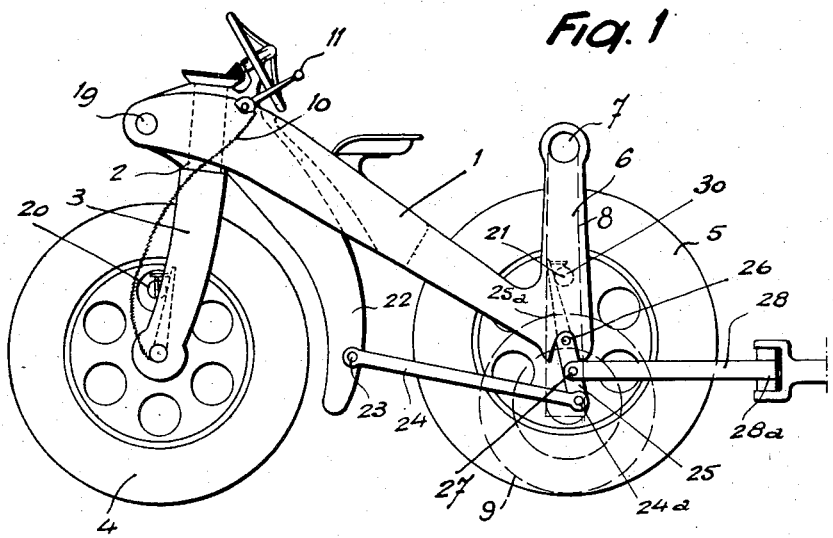
Figs. 1 and 2 are elevational views of two operating positions of a three-wheel tractor embodying the invention, as used for drawing an agricultural implement; two of said wheels being in alignment.
Figure 2:
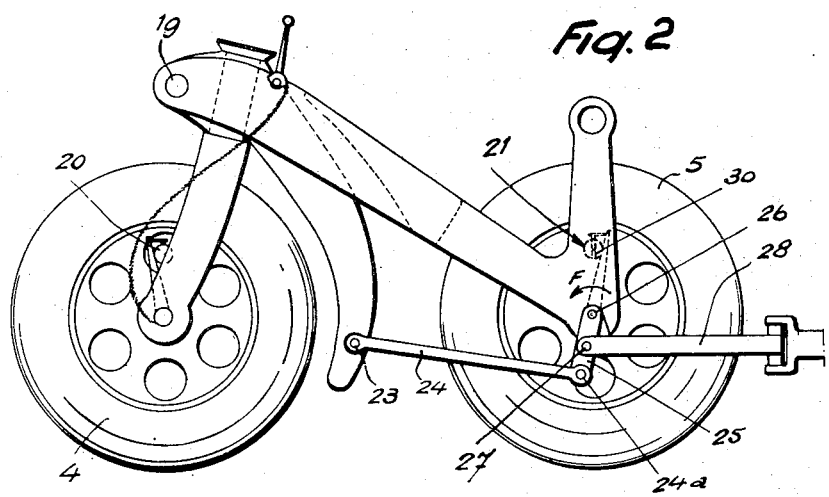

The tractor shown in Figs. 1 and 2 is of the known type having a frame comprising a beam 1 formed by two similar elements sloping downwards from front to rear and connected at their front by means of a horizontal pivot 19 to a tube 2 forming the steering tube of a front fork 3. The front fork 3 carries a wheel 4 while said similar elements form a rear fork carrying the wheel 5. The beam 1 is provided with an upright 6 adapted to serve as a support for a cylindrical socket 7. Said socket 7 carries in its turn a crank whose arm 8 is spaced transversally with reference to the plane of the tractor and provided at its lower end with a small sustaining wheel 9 in accordance with an arrangement known per se.

In accordance with one form of the invention, the wheels 4 and 5 are both wheels of a known type wherein their driving motors (of which only carburettors 20, 21 are visible) are mounted rigidly inside the wheels themselves.

The purpose of the provision of individual motors to supply power to each of these wheels is to remove all difficulty in the transmission of power to the wheel. The use at the front, for instance, of a driving wheel instead of a carrier wheel is for the purpose of modifying or increasing the power of the tractor in accordance with the work required, as may be necessary when different agricultural implements are applied thereto.

In an agricultural tractor, it is often unnecessary in practice to provide a change-speed gear as the vehicle is always intended to move at low speed. Neither, in the most general case is it necessary to provide a brake.

Preferably the invention may be employed when each wheel motor is provided with an automatic centrifugal clutch so as to allow, without stopping the corresponding motor, the required variations in speed between the different wheels, for instance in curves. Moreover, the centrifugal clutch may be associated with a ratchet or free-wheel device allowing the direct drive of the driving shaft through the wheel before engagement of the clutch so as to allow the starting of any of the motors through the movement of the vehicle itself.

The only control illustrated in the drawing is thus an accelerator control, i. e. an opening of the throttle valve of the carburettor in the usual case of an internal combustion motor. The carburettor 20 of the front wheel 5, may be controlled through yielding transmissions 10 actuated by a single lever 11.

Assuming that the motors have only speed for driving the wheels and are connected with the pinion driving said wheels through the agency of an automatic clutch and of a free-wheel ratchet system, the control of one carburettor is sufficient for controlling the whole of the vehicle. According to the invention, the carburettor 21 of the rear wheel 5 is automatically controlled in order that the two wheels have their power accurately adjusted one with reference to the other, said adjustment being capable of modification in accordance with the mechanical state of one motor with reference to the other.

The steering tube 2 is integral with a traction arm 22 having the shape of an arc about the front wheel. To the lower end of arm 22 are pivotally secured at 23 two links 24 arranged on either side of the wheel and adapted to be coupled at 24a with swing-bar 25. The swing-bar is pivotally secured at 26 for rocking around the axis of the rear wheel 5. To this swing-bar 25 and on either side of the wheel a tractional fork 28 is pivotally secured by a pivot 27. So as to equally distribute between the motors the tractional resistance the pivot 27 is located at equal distances between the points 26 and 24a on which the efforts of the two motors are exerted. The two arms of the fork 28 are connected at 28a to form a draw-bar of any suitable type which may comprise for instance a vertical axis to which is secured the end of the agricultural implement which it is desired to drive.

The swing-bar 25 has an arm 25a extending inside the wheel acting on the throttle valve 30 of the carburettor 21.

Owing to the arrangement which has just been described, the tractional stress is transmitted simultaneously through the link 24 and tractional fork 28 to the front and rear wheels, the front wheel being adapted to rock around the pivot 19 so that the spacing between the two wheels may vary and produce a rocking of the lever 25—25a around the pivot 26.

When the vehicle stops, the two wheels occupy for instance the relative positions illustrated in Fig. 1 in which they are the nearest, which correspond to a closing of the throttle valve of the carburettor 21.

As disclosed hereinabove, the driver acts when starting only on the carburettor 20 of the front wheel. The vehicle has then a tendency to progress. But as the front wheel is alone capable of producing a driving effort by reason of the carburettor of the rear wheel being closed, there is produced a relative displacement of the front wheel with reference to the rear wheel such that the throttle valve 30 of the carburettor (Fig. 2) opens. The motor of the rear wheel starts then operating at full power; if the tractional effort obtained is higher than that provided by the front wheel, i. e. if the rear wheel comes too near the front wheel, the lever 25 will have a tendency to pivot in the direction of the arrow F (Fig. 2) whereby it produces a partial closing of the throttle valve 30.

It is thus apparent that there is produced during operation an automatic equilibrium between the power provided by the motor of the rear wheel and the tractional effort required from said wheel in conformity with the principle disclosed hereinabove.

Figure 3:
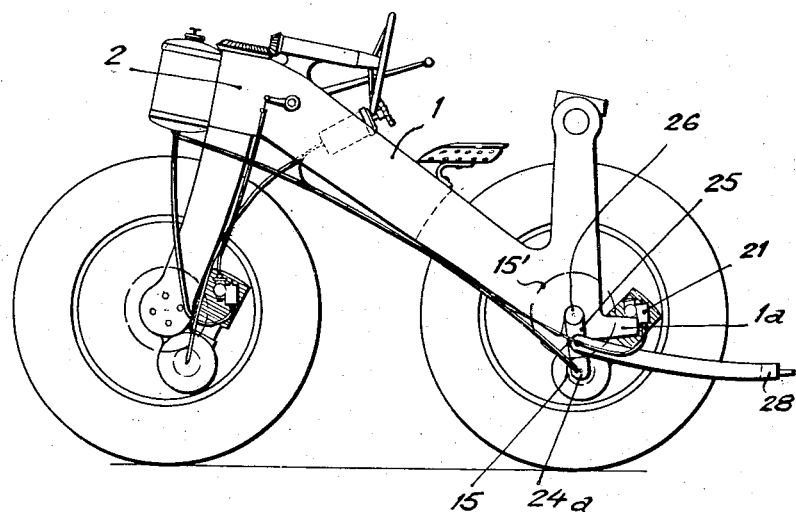
Figs. 3 and 4 show two different positions of operation of a modification of the invention.
Figure 4:
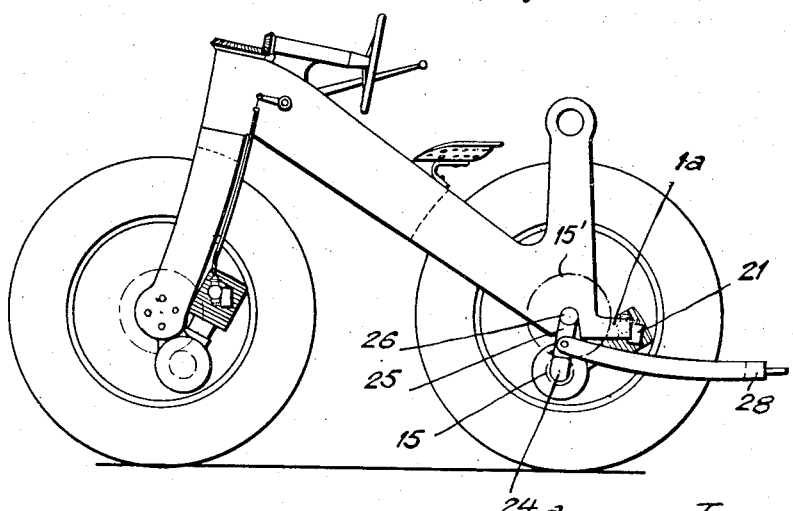

Figs. 3 and 4 illustrate a modification according to which the relative adjustment of the motors of the two wheels is not ensured by the relative displacement of these wheels, but by the relative displacement of the points of application of the resistant stresses or driving forces applied to each of said wheels. In this modification as in that previously described, the motors move relatively to each other.

In Figs. 3 and 4 the frame is rigid, i. e. the steering tube 2 is integral with the beam 1, and the pivoting axis 24a of the lever 25 is coaxial with the axis of the driving pinion 15. Consequently the driving effort of the front wheel is applied to the pivot 26 integral with the rigid frame while the driving effort of the rear wheel is applied at 24a. The relative variation of these efforts produces therefore a rotation of the pinion 15 around the gear 15' and consequently a pivoting motion of the lever 25 around the pivot 26. Such a pivoting motion is used as in the preceding example for correcting the adjustment of the carburettor 21.

In Figs. 3 and 4 the carburettor rocks integrally with the pivot 24a relative to an extension 1a of the frame. This extension thus forms a stationary control member which controls the action of (i. e. admission of fuel to) the carburettor.

Figs. 3 and 4 illustrate respectively the case where the power of the rear motor is too low or too high and the pinion 15 consequently moves backwards or forwards so as to open or to close the throttle.

Fig. 5 shows the application of the same principles to the control of two motors arranged side by side.

The tractor shown in Fig. 5 comprises two horizontal beams 35, 35' coupled with one another and each comprising a front steering wheel 34 or 34' carried by a fork 3 adapted to rotate in a steering tube 2 integral with the horizontal beam 35, and a casing 36 or 36' partly surrounding the rear driving wheel 37 or 37'. In the case considered, this wheel may be driven by a motor 38 or 38' arranged in any suitable manner on the frame. One of the beams, beam 35 for instance, comprises a seat 39 and a gas-controlling handle 38c adapted to act directly on the carburettor 38a of the motor 38 driving the wheel 37. I will again suppose that there is only one driving speed and that the clutches of the two motors are of an automatic type. On the other hand, the carburettor 38b of the motor 38' driving the wheel 37', is controlled automatically in the manner to be described hereinafter.

The coupling of the two beams 35—35' is ensured in the following manner. The steering pivots 40 within steering tubes 2 and rigid with the forks 3 are connected through a coupling bar 41 mounted on bearings 42 above the end of the steering tubes 40 in such manner as to allow vertical and horizontal displacements of the two beams one with reference to the other. The steering pivots 40 are on the other hand respectively integral with steering levers 43 or 43' which are coupled together by a connecting rod 45 pivotally secured to the levers 43, 43' at 46 and 46'. The lever 43 of the beam 35 ends with a control handle 44. Consequently the operation of the handle 44 or of any other suitable equivalent control device will control simultaneously the steering of the two wheels 34.

Each of these two beams 35, 35' is provided with a fork 47 or 47' secured to the axis of the rear wheel. The fork 47 of the beam 35 may oscillate freely with reference to its axis, but the other fork 47' is bolted to the casing by means of a screw 47a in an unvariable substantially vertical position. Extending upwardly from each of the two forks 47 and 47' is a pivot 48 and over each is engaged a trunnion sleeve or socket provided at either end of a rear coupling bar 49.

For recording the relative displacement in a longitudinal direction of the beam 35 with reference to the beam 35', I provide a horizontal link 55. This link is caused to move in a direction parallel to the direction of movement of the tractors by an arrangement shown diagrammatically in Fig. 5. At its rear end link 55 is pivotally connected to coupling bar 49 at 54. The front end of link 55 has a slot 56 inside which is engaged a finger 57 provided on a bracket 58 integral with the steering tube 2 of the beam 35'. In practice the displacement of link 55 may be braked by a damper shown diagrammatically in Fig. 6 wherein a piston 59 is provided at the end of the link 55 and moves inside a cylinder 60 integral with the bracket 58. The displacements thus limited are used for controlling the carburettor 38' of the motor 38. To this end, this link 55 may have thereon a rack 55a meshing with the pinion 61 arranged on the axis of the throttle valve of the carburettor.

The consequence of this arrangement is that as soon as the motor 38 on the left (looking in the direction F) is started, it will move the beam 35 with reference to the beam 35' in the direction F (Fig. 5), i. e. it will advance with reference thereto. The coupling bar 49 will then pivot in the direction F' around the pivot 48 of the beam 35' and the link 55 will also move in the direction F''. Through its rack 55a, it will then produce the opening of the throttle valve of the carburettor of the right hand motor which produces a corresponding acceleration in speed of the beam 35' and the two beams will progress thus side by side, with the gas admitting ports perfectly equivalent as long as they have to exert equal efforts corresponding to the resistances opposed by the agricultural implements 53. If one of these efforts becomes predominant, one of the beams recedes with reference to the other and produces a displacement of the link 55 in the direction F for accelerating 35' with reference to 35 or in the opposite direction for slowing down 35' with reference to 35.

The lower end of each of the forks 47 and 47' is provided on its front side with a bearing surface 50 (Fig. 7) through the agency of which the tractional effort is transmitted to a horizontal tractional fork 51 connected through a strap 52 to the fork 47 itself.

The agricultural implements 53 are then coupled in any suitable manner to the tractional fork 51 for instance through the agency of a horizontal axle pin 53a.

Such a system of tractor with two beams each carrying a motor may be used to advantage either for the simultaneous operation in two rows of vinestocks for instance over the plants of which it rides easily.

I claim:

1. In a vehicle, a chassis, at least two wheels, an internal combustion engine provided on the inside of each of at least two of said wheels, a throttle for each engine, a driving gear coaxial with at least one of the said wheels, means mounting the engine of the said wheel to enable oscillation with respect to the axis of the wheel in a longitudinal plane, a pinion which is driven by the said engine and is constantly in mesh with the driving gear, and means to transform the oscillation motion of the engine around the axis of the wheel into a shifting of the throttle of that engine.

2. In an automotive vehicle, a plurality of driving wheels having separate axes, separate engines to drive each of said wheels, a throttle for each engine, frame means interconnecting said wheels, means to mount the engine driving one wheel shiftably relative to the axis of another wheel in a direction forwardly or rearwardly as related to the movement of the vehicle, and means to transform the relative motion of said engine and said other wheel to operate the throttle of the said engine to automatically control the latter.

3. In an automotive vehicle, a plurality of driving wheels having separate axes, a separate engine to drive each wheel, a throttle for each engine, frame means interconnecting said wheels, means to mount said wheels on said frame means to enable shifting of one wheel relative to the axis of another in a direction forwardly or rearwardly as related to the movement of the vehicle, and means to transform relative motion of said axes into shifting of the throttle of one engine whereby to control automatically one of said engines.

4. A vehicle as claimed in claim 3 wherein the wheels comprise a front wheel and rear wheel and the front wheel is shiftable relative to the frame means, and wherein the transforming means comprises a lever pivoted coaxially with the rear wheel, and means connected with said lever to coordinate movement of the lever with the shifting of the front wheel.

5. A vehicle as claimed in claim 4 having a traction bar pivotally connected to said lever at a point to equally distribute the tractive effort of said front and rear wheels.

6. A vehicle comprising a plurality of driving wheels, frame means connecting said wheels, an internal combustion engine driving each of said wheels, a throttle for each engine, mounting means enabling the motor of one wheel to move relatively to the motor of another whenever one driving wheel tends to move faster or slower than the other, and interconnecting means between said motors movable responsive to the relative movement of said motors, and means connecting the throttle of at least one motor with said interconnecting means to cause said relative movement to retard or advance said throttle and thereby automatically to maintain a certain relation between the tractive effort of said engines.

7. A vehicle comprising a plurality of driving wheels, frame means connecting said wheels, an internal combustion engine provided inside of each of said wheels, means mounting said wheels on said frame means, a portion of said frame means being movable relative to the remainder enabling shifting of one wheel relatively to the other in a direction forwardly or rearwardly as related to the movement of the vehicle, and means responsive to said relative movement to operate the throttle of one of said engines to maintain a certain relation between the tractive effort of said engines.

8. A vehicle comprising front and rear driving wheels, frame means connecting said wheels, an internal combustion engine inside each of said wheels, means mounting one of said engines for movement relative to said frame means, a lever, means to coordinate said relative movement with the movement of said lever, said lever being pivoted on the frame coaxially with the rear wheel, and means connecting said lever with the throttle of the engine for said rear wheel to control said rear engine.

9. A vehicle as claimed in claim 8, having a traction bar pivotally connected to said lever at a point to equally distribute the tractive effort of said front and rear engines.

10. A vehicle as claimed in claim 1 wherein the transforming means includes a lever connecting the axis of the wheel and the axis of the pinion, and means to connect a trailer to said lever.

11. A vehicle having frame means including two parallel frame members, two wheels in alignment associated with each of said parallel frame members, one of each of said aligned wheels having an internal combustion engine driving it, parallel means connecting said parallel members to maintain said members in parallelism, and enabling relative longitudinal movement of said members with respect to each other, and means to translate and transmit said relative movement to the throttle of one of said engines for automatically maintaining equal tractive effort of said engines.

EMILE BOBARD.

REFERENCES CITED

The following references are of record in the file of this patent:

UNITED STATES PATENTS

| Number | Name | Date |
| --- | --- | --- |
| 791,180 | Cantono | May 30, 1905 |
| 904,721 | Perillard | Nov. 24, 1908 |
| 1,168,300 | Gorman | Jan. 18, 1916 |
| 1,241,355 | Donnell | Sept. 25, 1917 |
| 1,290,277 | Merkel | Jan. 7, 1919 |
| 1,302,656 | Haussmann | May 6, 1919 |
| 1,310,604 | Burgess | July 22, 1919 |
| 1,877,126 | Greer | Sept. 13, 1932 |
| 2,030,548 | Smeets | Feb. 11, 1936 |
| 2,384,470 | Keese et al. | Sept. 11, 1945 |
| 2,483,177 | Bobard | Sept. 27, 1949 |

FOREIGN PATENTS

| Number | Country | Date |
| --- | --- | --- |
| 236,467 | Great Britain | July 9, 1925 |
| 675,845 | France | Nov. 18, 1929 |